Patented Apr. 25, 1939

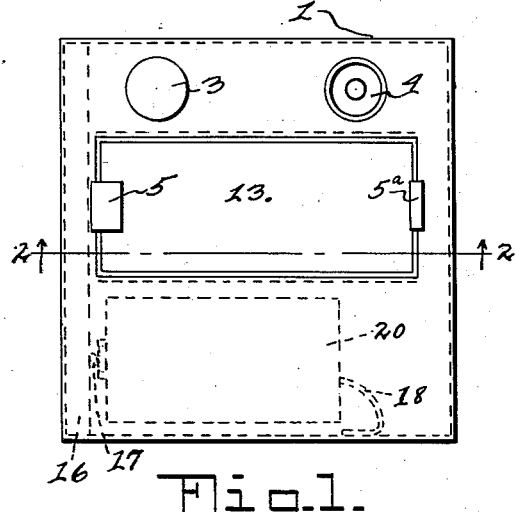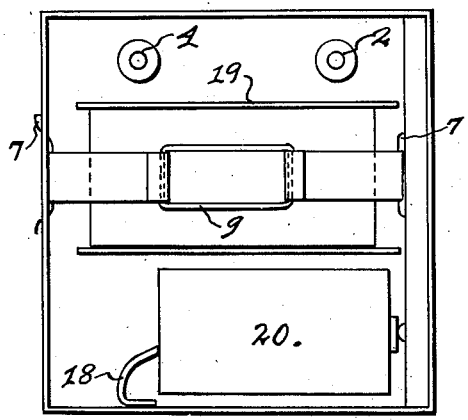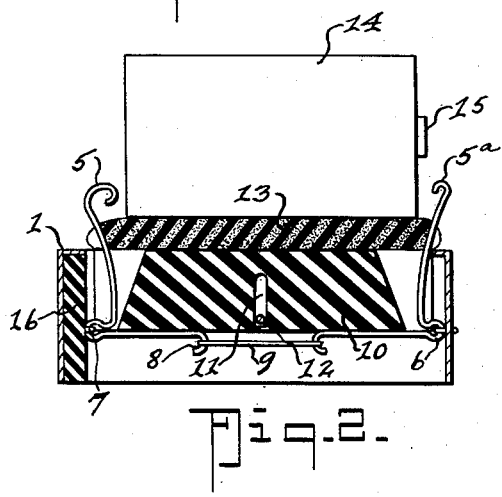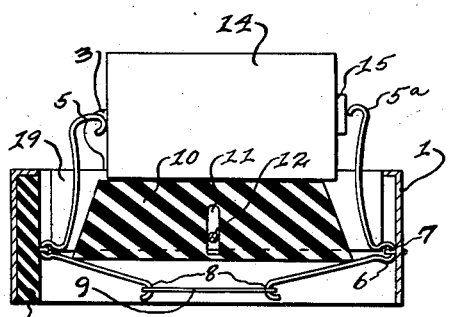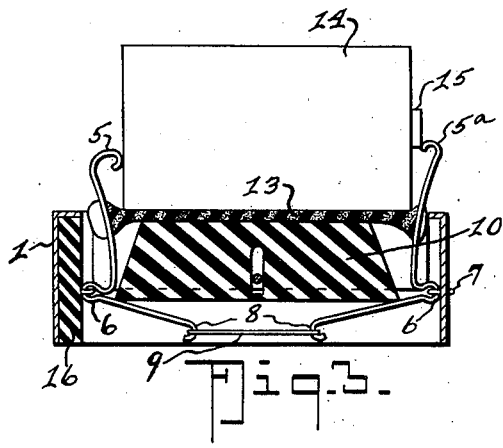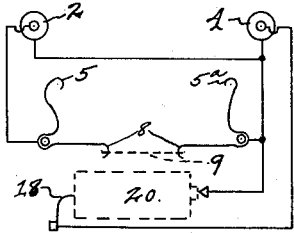
Inventor
EDWIN T. STRATTON April 25, 1939.  E. T. STRATTON  2,155,778
BULB AND BATTERY TESTER
Filed June 17, 1938  2 Sheets-Sheet 2
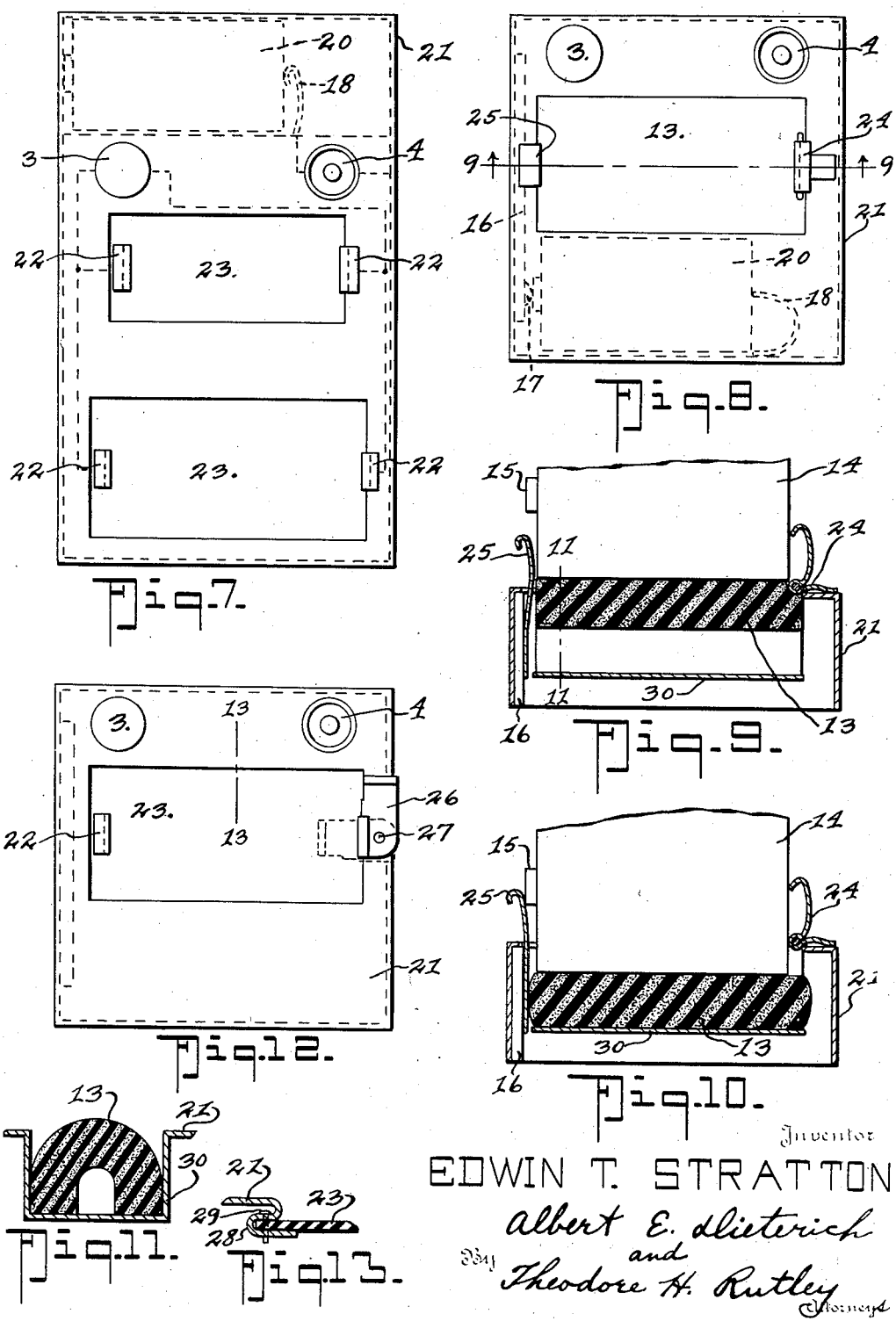

2,155,778

UNITED STATES PATENT OFFICE 2,155,778

BULB AND BATTERY TESTER

Edwin T. Stratton, Memphis, Tenn.

Application June 17, 1938, Serial No. 214,392

11 Claims. (Cl. 175—183)

This invention relates to an improved battery and bulb tester for the purpose of quickly testing flash-light batteries and bulbs to ascertain their strength.

One object of the invention is to provide a tester which will readily test various sizes of batteries.

Another object of the invention is to provide a resilient base, against which the battery to be tested is forced in order to make contacts which close the circuit; thus as soon as the battery is released it is ejected upwards away from the contacts, eliminating the likelihood of burning the battery or testing bulb excessively.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a plan view of the preferred form of the invention.

Fig. 2 is a cross-sectional view taken on the line 2—2 of Fig. 1, showing a battery in position to be tested.

Fig. 3 is a cross-sectional view similar to Fig. 2, with the battery pressed down into a testing position.

Fig. 4 is an inverted plan view of Fig. 1.

Fig. 5 is a cross-sectional view similar to Fig. 3, modified in that the rubber pad has been eliminated, showing a small battery being tested.

Fig. 6 is a diagram showing a typical circuit.

Fig. 7 is a plan view of a modified form of the invention.

Fig. 8 is a plan view of another modification.

Fig. 9 is a cross-sectional view taken on the line 9—9 of Fig. 8, showing a battery in position to be tested.

Fig. 10 is a view similar to Fig. 9, showing the battery pressed down into testing position.

Fig. 11 is a detail cross section taken on the line 11—11 of Fig. 9.

Fig. 12 is a plan view of a further modification.

Fig. 13 is a detail cross section taken on the line 13—13 of Fig. 12.

In the drawings, in which like numerals and letters of reference indicate like parts in all the figures, 1 represents a casing having a threaded bulb socket 2 to receive a bulb 3 and the casing also having a threadless socket 4 in which bulbs may be inserted for testing. The forms of the invention shown in Figs. 1 to 6, inclusive, have contact clips 5 and 5a of springy metal hinged at 6 on the pins 7. The contact clips 5 and 5a are bent over at 8 to receive the rubber spring 9.

A platform 10 of material having insulating qualities is slotted at 11 and has a pin 12 located within the slot 11 to limit the movement of the platform.

The platform 10 has a sponge-rubber pad 13, or other suitable resilient material glued to its top side. The casing 1 is turned under as at 19 to form a guide for the platform 10.

The battery to be tested is indicated by 14 and its terminal by 15.

A strip of insulation 16 is located within the casing and it carries a contact 17 against which the bulb testing battery 20 is held by the clip 18.

In Figs. 7 to 13, inclusive, the numeral 21 indicates the casing.

Fig. 7 uses contact clips 22 and sheet rubber platform 23. This platform can be made of other suitable resilient material.

Fig. 12 uses a single platform 23 and one stationary contact 22. The other contact is indicated by 26 and is pivoted at 27 so that it may be turned around to suit the size of the battery being tested.

Figs. 8, 9 and 10 all use a sponge rubber platform 13, shown in cross section in Fig. 11. In these figures a receptacle 30 is formed in the casing 21 to receive the platform 13; also in these figures a spring clip 25 is used on one side and a hinged clip 24 is used on the other side. This hinged clip has its long end up for large batteries and down against the platform for small batteries.

Fig. 13 shows the way in which the rubber sheet platform, used in Figs. 7 and 12, is retained by rolled-over part 28 of the casing 21. Pins 29 are inserted through the rolled portion 28 to keep the same in place.

Operation

To prepare the tester the bulb testing battery 20 is placed in the under side of the casing with the terminal of the battery held against the contact 17 by the clip 18 which is grounded to the casing. The contact 17 is wired in a circuit to the threadless socket 4. Thus a bulb may be tested by inserting it in the socket 4.

The tester is prepared for testing batteries by screwing bulb 3 in socket 2. It is obvious from a reading of the drawings, how the batteries are tested. All of the forms of the invention will test either a large or a small battery. The battery is merely pressed down until the terminal of the battery touches the contact on one side and the other end of the battery is touching the contact on the other side.

One particular feature of this device is that the battery is immediately ejected away from the contacts when the pressure applied by the operator is released; thus the battery and test bulb are not unnecessarily burned.

The hinged type of contact 24, shown in Figs. 8, 9 and 10, is tipped over on the rubber for testing small batteries. The drawings show how it is used on the large battery.

Fig. 12 shows a type of contact which swings around to the dotted-line position for small batteries, and when testing the small batteries the clip contact 22 yields slightly when the battery is pressed down.

From the foregoing description, taken in connection with the accompanying drawings, it is thought that the construction, operation and advantages of the invention will be clear to those skilled in the art.

What I claim is:

1. In a flash light battery tester, a casing, a light bulb socket and a bulb therein, a pair of spaced-apart contact members for engaging the electrical terminals of a battery-to-be-tested, said socket and said contacts being mounted in said casing and electrically connected in circuit, yieldable means for receiving the battery and holding it out of contact with said contact members until pressure is applied to cause said yieldable means to yield.

2. In a flash light battery testing apparatus, a test bulb, a pair of circuit terminals electrically connected with said bulb and adapted to engage the electrical terminals of the battery-to-be-tested when said battery is placed in contact with said terminals, combined with means to move the battery bodily away from and out of electric circuit with said pair of circuit terminals after the battery shall have been tested, and a support for the aforesaid elements.

3. In a battery tester, a support, a test indicator mounted on said support, a pair of spaced contacts mounted on said support and electrically insulated from one another and electrically connected with said indicator, yieldable means on said support between said spaced contacts to receive the battery-to-be-tested and including means continuously tending to prevent contact being made between said spaced contacts and the battery.

4. In a battery tester, a support, a test indicator mounted on said support, a pair of spaced contacts mounted on said support and electrically insulated from one another and electrically connected with said indicator, yieldable means on said support between said spaced contacts to receive the battery-to-be-tested and including means continuously tending to prevent contact being made between said spaced contacts and the battery, at least one of said pair of contacts being pivoted.

5. In a battery tester, a support, a test indicator mounted on said support, a pair of spaced contacts mounted on said support and electrically insulated from one another and electrically connected with said indicator, yieldable means on said support between said spaced contacts to receive the battery-to-be-tested and including means continuously tending to prevent contact being made between said spaced contacts and the battery, at least one of said pair of contacts being pivoted, said pivoted contact having two battery-engaging elements, one for short batteries and one for long batteries.

6. In a battery tester, a support, a test indicator mounted on said support, a pair of spaced contacts mounted on said support and electrically insulated from one another and electrically connected with said indicator, yieldable means on said support between said spaced contacts to receive the battery-to-be-tested and including means continuously tending to prevent contact being made between said spaced contacts and the battery, at least one of said pair of contacts being pivoted, and means governed by the insertion of a battery-to-be-tested into test position for moving said pivoted contact into operative engagement with the said battery.

7. In a battery tester, a support, a test indicator mounted on said support, a pair of spaced contacts mounted on said support and electrically insulated from one another and electrically connected with said indicator, yieldable means on said support between said spaced contacts to receive the battery-to-be-tested and including means continuously tending to prevent contact being made between said spaced contacts and the battery, said yieldable means comprising a depressible platform and spring means to elevate the same.

8. In a battery tester, a support, a test indicator mounted on said support, a pair of spaced contacts mounted on said support and electrically insulated from one another and electrically connected with said indicator, yieldable means on said support between said spaced contacts to receive the battery-to-be-tested and including means continuously tending to prevent contact being made between said spaced contacts and the battery, said yieldable means comprising a depressible platform and spring means to elevate the same, and a sponge-rubber pad on said platform.

9. In a battery tester, a support, a test indicator mounted on said support, a pair of spaced contacts mounted on said support and electrically insulated from one another and electrically connected with said indicator, yieldable means on said support between said spaced contacts to receive the battery-to-be-tested and including means continuously tending to prevent contact being made between said spaced contacts and the battery, said yieldable means comprising a depressible platform and spring means to elevate the same, one of said pair of contacts being pivoted and having means engageable by said platform upon depressing the platform for moving said pivoted contact into operative engagement with the battery-to-be-tested when the same shall have been placed on the platform.

10. In a flash light battery and bulb tester comprising a casing, a recess in said casing, a pair of hinged contacts, a spring between said contacts, a platform of insulated material located within said recess and between said contacts to receive the battery-to-be-tested, a bulb socket in said casing, a test bulb located in said socket, said bulb socket being in electrical connection with said contacts, a testing battery in said casing, and a threadless socket in said casing in electrical connection with said testing battery for the purposes described.

11. In a flash light battery and bulb tester comprising a casing, a recess in said casing, a pair of hinged contacts, a spring between said contacts, a platform of insulated material located within said recess and between said contacts to receive the battery-to-be-tested, a bulb socket in said casing, a test bulb located in said socket, said bulb socket being in electrical connection with said contacts, a testing battery in said casing, a threadless socket in said casing in electrical connection with said testing battery, a resilient pad located on the top side of said platform, and means to limit the movement of said platform.

EDWIN T. STRATTON.